(12) United States Patent
Lee

(10) Patent No.: US 11,880,417 B2
(45) Date of Patent: Jan. 23, 2024

(54) METHOD, SYSTEM AND RECORDING MEDIUM FOR PROVIDING MAP SERVICE, AND FILE DISTRIBUTION SYSTEM

(71) Applicant: NAVER CORPORATION, Seongnam-si (KR)

(72) Inventor: Hyun Jung Lee, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 707 days.

(21) Appl. No.: 14/709,130

(22) Filed: May 11, 2015

(65) Prior Publication Data
US 2015/0324389 A1    Nov. 12, 2015

(30) Foreign Application Priority Data

May 12, 2014  (KR) .......................... 10-2014-0056458

(51) Int. Cl.
| G06F 16/00 | (2019.01) |
| G06F 16/95 | (2019.01) |
| G06F 16/29 | (2019.01) |

(52) U.S. Cl.
CPC .............. *G06F 16/95* (2019.01); *G06F 16/29* (2019.01)

(58) Field of Classification Search
CPC ................................. G06F 16/29; G06F 16/95
USPC ........................................................ 707/736
See application file for complete search history.

(56) References Cited

U.S. PATENT DOCUMENTS

| 6,516,311 B1 * | 2/2003 | Yacoby ................. G06Q 30/02 707/999.005 |
| 6,591,266 B1 * | 7/2003 | Li ....................... G06F 16/9574 707/999.009 |
| 7,076,505 B2 * | 7/2006 | Campbell ............ G01C 21/367 715/764 |
| 7,743,048 B2 * | 6/2010 | Baldwin ............. G06F 16/9537 707/724 |
| 7,818,333 B2 * | 10/2010 | Biard ..................... G01C 21/28 707/742 |
| 8,078,986 B1 * | 12/2011 | Rhyne .................. G06Q 20/204 705/40 |

(Continued)

FOREIGN PATENT DOCUMENTS

| KR | 10-2006-0034491 | 4/2006 |
| KR | 20120067830 A | 6/2012 |

(Continued)

OTHER PUBLICATIONS

Jul. 17, 2015 Korean Office Action issued in corresponding Korean Application No. 10-2014-0056458.

*Primary Examiner* — Albert M Phillips, III
*Assistant Examiner* — Rezwanul Mahmood
(74) *Attorney, Agent, or Firm* — Harness, Dickey & Pierce, P.L.C.

(57) ABSTRACT

Provided is a method, apparatus, system, and/or computer readable medium for providing a map service. The map providing method may include extracting region information attached to a posting in response to an execution of a storage capability or a sharing capability by a user to the posting displayed on a page accessible to a computer, storing address information of the posting and the extracted region information associated with the user, and displaying a point of interest corresponding to the region information on a map service screen associated with the user.

20 Claims, 15 Drawing Sheets

(56) References Cited

U.S. PATENT DOCUMENTS

| | | | | |
|---|---|---|---|---|
| 8,108,245 B1* | 1/2012 | Hosea | H04L 67/535 | 705/7.29 |
| 8,255,411 B1* | 8/2012 | Carpenter | G06F 16/248 | 707/765 |
| 8,281,246 B2* | 10/2012 | Xiao | G06F 16/29 | 715/738 |
| 8,316,001 B1* | 11/2012 | Albrecht | G06F 9/451 | 707/706 |
| 9,037,485 B2* | 5/2015 | Fu | H04W 4/023 | 705/14.66 |
| 9,208,171 B1* | 12/2015 | Cotting | G06F 16/50 | |
| 9,253,137 B1* | 2/2016 | Jackson | H04L 51/52 | |
| 9,854,395 B2* | 12/2017 | Lee | G01C 21/3697 | |
| 2002/0062360 A1* | 5/2002 | Ishiguro | H04L 61/35 | 709/219 |
| 2002/0065691 A1* | 5/2002 | Twig | H04L 67/306 | |
| 2003/0182275 A1* | 9/2003 | Nakajima | G06F 16/9537 | |
| 2003/0233403 A1* | 12/2003 | Bae | G06F 16/95 | 707/E17.107 |
| 2004/0059997 A1* | 3/2004 | Allen | H04L 43/0876 | 707/E17.119 |
| 2005/0066286 A1* | 3/2005 | Makela | H04M 1/72445 | 715/764 |
| 2005/0270305 A1* | 12/2005 | Rasmussen | G01C 21/367 | 345/613 |
| 2005/0270311 A1* | 12/2005 | Rasmussen | G09B 29/10 | 345/677 |
| 2005/0288854 A1* | 12/2005 | Kitajima | G01C 21/367 | 701/532 |
| 2006/0065733 A1* | 3/2006 | Lee | H04M 1/2755 | 235/462.01 |
| 2006/0074555 A1* | 4/2006 | Liu | G01C 21/26 | 340/995.12 |
| 2006/0200390 A1* | 9/2006 | Ananian | G06Q 30/0633 | 705/26.8 |
| 2007/0011150 A1* | 1/2007 | Frank | G06F 16/9537 | |
| 2007/0038950 A1* | 2/2007 | Taniguchi | G01C 21/26 | 715/768 |
| 2007/0080830 A1* | 4/2007 | Sacks | G01C 21/3881 | 340/995.1 |
| 2007/0244631 A1* | 10/2007 | Jung | G01C 21/20 | 701/533 |
| 2008/0036586 A1* | 2/2008 | Ohki | G01C 21/362 | 340/539.13 |
| 2008/0132251 A1* | 6/2008 | Altman | G06Q 30/0268 | 455/457 |
| 2008/0147641 A1* | 6/2008 | Leffingwell | G06F 16/951 | 707/999.005 |
| 2008/0218310 A1* | 9/2008 | Alten | A43B 5/00 | 702/182 |
| 2008/0263143 A1* | 10/2008 | Takahashi | G06Q 30/02 | 709/203 |
| 2009/0024920 A1* | 1/2009 | Bulpitt | G06F 16/9577 | 715/700 |
| 2009/0031245 A1* | 1/2009 | Brezina | H04M 15/43 | 707/999.1 |
| 2009/0094327 A1* | 4/2009 | Shuster | H04L 67/01 | 707/999.103 |
| 2009/0119268 A1* | 5/2009 | Bandaru | G06F 40/258 | 707/E17.015 |
| 2010/0060650 A1* | 3/2010 | Yamakami | H04N 21/235 | 345/474 |
| 2010/0114854 A1* | 5/2010 | Lee | G06F 16/9537 | 707/707 |
| 2010/0118035 A1* | 5/2010 | Yamakami | G06F 16/70 | 345/473 |
| 2010/0182341 A1* | 7/2010 | Lee | G06F 16/489 | 345/635 |
| 2010/0268596 A1* | 10/2010 | Wissner | G06Q 30/00 | 707/769 |
| 2010/0274696 A1* | 10/2010 | Krietzman | H04N 21/2743 | 725/152 |
| 2010/0306185 A1* | 12/2010 | Smith | G06F 16/24578 | 707/738 |
| 2010/0306228 A1* | 12/2010 | Carpenter | G06Q 30/02 | 707/765 |
| 2011/0029890 A1* | 2/2011 | Cosgrove | G06Q 20/4015 | 715/835 |
| 2011/0078139 A1* | 3/2011 | Xiao | G06F 16/29 | 707/E17.109 |
| 2011/0078575 A1* | 3/2011 | Xiao | G06F 16/29 | 715/738 |
| 2011/0119593 A1* | 5/2011 | Jacobson | H04L 51/18 | 715/736 |
| 2011/0166901 A1* | 7/2011 | Rodriguez-Matos | G06F 16/93 | 707/812 |
| 2011/0276396 A1* | 11/2011 | Rathod | G06Q 30/0282 | 707/706 |
| 2011/0285591 A1* | 11/2011 | Wong | G01S 5/0036 | 342/451 |
| 2011/0301831 A1* | 12/2011 | Setlur | G06F 16/29 | 715/764 |
| 2012/0041983 A1* | 2/2012 | Jennings | H04L 41/0893 | 707/E17.005 |
| 2012/0124145 A1* | 5/2012 | Krietzman | G06Q 30/0251 | 709/217 |
| 2012/0159371 A1* | 6/2012 | Thrapp | G06F 16/29 | 715/772 |
| 2012/0173988 A1* | 7/2012 | Tran | G06F 3/04842 | 715/738 |
| 2013/0166207 A1* | 6/2013 | Shao | G01C 21/3476 | 701/537 |
| 2013/0262457 A1* | 10/2013 | Lian | G06F 16/29 | 707/E17.014 |
| 2013/0339337 A1* | 12/2013 | Alkhateeb | G06F 16/951 | 707/710 |
| 2014/0129942 A1* | 5/2014 | Rathod | H04N 21/44226 | 715/720 |
| 2014/0143004 A1* | 5/2014 | Abhyanker | G06Q 30/02 | 705/7.19 |
| 2014/0149846 A1* | 5/2014 | Ansel | G06F 16/35 | 715/234 |
| 2014/0164365 A1* | 6/2014 | Graham | G06Q 50/01 | 707/723 |
| 2014/0189888 A1* | 7/2014 | Madhok | H04L 63/102 | 726/29 |
| 2014/0200803 A1* | 7/2014 | Kinoshita | G01C 21/3655 | 701/428 |
| 2014/0203071 A1* | 7/2014 | Eggert | H04L 67/104 | 235/375 |
| 2014/0213304 A1* | 7/2014 | Beckett | H04W 4/021 | 455/456.6 |
| 2014/0214491 A1* | 7/2014 | Semeniuk | G06Q 30/0283 | 705/7.35 |
| 2014/0223285 A1* | 8/2014 | Yoon | G06F 40/14 | 715/234 |
| 2014/0229279 A1* | 8/2014 | Hohs | G06Q 30/0251 | 705/14.58 |
| 2014/0244429 A1* | 8/2014 | Clayton | G06Q 30/0631 | 705/26.7 |
| 2014/0244447 A1* | 8/2014 | Kim | G06Q 30/0643 | 705/27.2 |
| 2014/0244488 A1* | 8/2014 | Kim | H04L 1/1614 | 705/39 |
| 2014/0256357 A1* | 9/2014 | Wang | H04W 4/022 | 455/456.3 |
| 2014/0278862 A1* | 9/2014 | Muppala | G06Q 30/0613 | 705/14.16 |
| 2014/0310348 A1* | 10/2014 | Keskitalo | H04L 65/4046 | 709/204 |
| 2014/0364158 A1* | 12/2014 | Hwang | H04M 1/72445 | 455/466 |
| 2014/0365944 A1* | 12/2014 | Moore | G09B 29/003 | 715/772 |
| 2015/0005041 A1* | 1/2015 | Lim | H04M 19/04 | 455/567 |
| 2015/0111603 A1* | 4/2015 | Rivard | G06Q 50/01 | 455/456.3 |

(56) References Cited

U.S. PATENT DOCUMENTS

| | | | | |
|---|---|---|---|---|
| 2015/0120440 A1* | 4/2015 | Jung | ................. | G06Q 30/0253 |
| | | | | 705/14.51 |
| 2015/0120756 A1* | 4/2015 | Grunick | ............... | G06F 16/955 |
| | | | | 707/748 |
| 2015/0153934 A1* | 6/2015 | Zherebtsov | ............. | G06F 16/00 |
| | | | | 715/810 |
| 2015/0205879 A1* | 7/2015 | Karasudani | ........... | G06F 16/957 |
| | | | | 707/737 |
| 2015/0211866 A1* | 7/2015 | Tang | .................... | H04L 67/104 |
| | | | | 709/204 |
| 2015/0324389 A1* | 11/2015 | Lee | ......................... | G06F 16/29 |
| | | | | 707/736 |
| 2016/0012465 A1* | 1/2016 | Sharp | .................. | G06Q 20/321 |
| | | | | 705/14.17 |
| 2016/0147899 A1* | 5/2016 | Smith | .................... | G06Q 50/01 |
| | | | | 707/736 |
| 2016/0359987 A1* | 12/2016 | Laliberte | ............... | H04L 51/52 |
| 2017/0177194 A1* | 6/2017 | Lyons | .................... | H04L 67/06 |
| 2019/0052701 A1* | 2/2019 | Rathod | .............. | H04L 12/1827 |
| 2020/0110966 A1* | 4/2020 | Revaud | ............... | G06V 10/454 |
| 2021/0160653 A1* | 5/2021 | Omidvar Tehrani | . | H04W 4/024 |
| 2021/0334326 A1* | 10/2021 | Viswanathan | ...... | G06F 16/9536 |
| 2021/0381840 A1* | 12/2021 | Viswanathan | .......... | G09G 5/37 |
| 2022/0075832 A1* | 3/2022 | Ayzenshtat | ........... | G06F 16/951 |

FOREIGN PATENT DOCUMENTS

| | | |
|---|---|---|
| KR | 10-2012-0114443 | 10/2012 |
| KR | 10-2013-0031145 | 3/2013 |
| KR | 10-2014-0019119 | 2/2014 |

* cited by examiner

METHOD, SYSTEM AND RECORDING MEDIUM FOR PROVIDING MAP SERVICE, AND FILE DISTRIBUTION SYSTEM

CROSS-REFERENCE TO RELATED APPLICATION

This application claims priority from and the benefit of Korean Patent Application No. 10-2014-0056458, filed on May 12, 2014, the disclosure of which is incorporated herein in its entirety by reference.

BACKGROUND

Field

Example embodiments relate to a technology for providing a personalized map service.

Description of the Background

Currently, there exists technology for providing a map service on a web browser through the Internet in a mobile environment.

In addition, with generalization of infrastructures, for example, a mobile terminal, a global positioning system (GPS), and a camera phone, for creating location-based content, users may directly create location-based content at any time. The location-based content is used as region information corresponding to a location.

In a current service, a map service and a search service have different characteristics and thus, a user needs to connect to the search service and then search for region information to provide details information of an object displayed on a map in use at the map service. To verify a map or a location of a related region from region information retrieved through the search service, the user needs to connect to the map service and then search for the corresponding region.

In particular, in the related art, a method of connecting to a map service and then searching for and storing a corresponding region to store a region desired by the user has been employed. However, this method may be inappropriate for a general service use pattern of a user, for example, a pattern in which the user searches for region information in a search service and then connects to a map. Further, due to a difficulty in using the service, the method may not be regularly used.

SUMMARY

Some example embodiments provide a map providing method, apparatus, system and/or computer readable medium that may provide a personalized map service by automatically storing region information of a posting bookmarked by a user in a map service.

Some example embodiments also provide a map providing method, apparatus, system and/or computer readable medium that may provide a personalized map service by storing region information desired by a user in a map service through sharing of a posting.

Some example embodiments also provide a map providing method, apparatus, system and/or computer readable medium that may provide a push notification when a user is located around region information stored in a map service through a bookmark or a sharing function and/or capability.

According to an aspect of an example embodiment, there may be provided a map service providing method configured to be executed on a computer, the method may include extracting, using a processor of a computer, region information attached to a posting in response to an execution of a storage capability or a sharing capability by a user to the posting displayed on a page accessible to the computer, storing, using the processor, address information of the posting and the extracted region information associated with the user, and displaying, using the processor, a point of interest corresponding to the region information on a map service screen associated with the user.

The storage capability may be configured to save address information of the posting.

The storage capability may include at least one of a shortcut adding capability configured to set a shortcut to address information of the posting, a capturing capability configured to capture a page screen on which the posting is displayed, a copying capability configured to copy at least one of partial content of the posting and the address information to a clipboard, and a memo capability configured to store at least one of the partial content of the posting and the address information as a memo.

The sharing capability may be configured to call a map service for sharing information associated with the posting.

The sharing capability may be configured to call at least one service among a messenger, an e-mail, a message, a video, and a social networking service (SNS) to share information associated with the posting.

The displaying may include sorting and displaying the point of interest based on at least one item of a region and a category.

The displaying may include displaying information comprising at least one representative image associated with the posting at the point of interest.

The displaying may comprise displaying, as the representative image, any one of an image at a top end of the posting among images attached to the posting, an image set by a creator of the posting, and an image set by the user, or an image captured from a video attached to the posting.

The method may further include moving from the map service screen to a page accessible to the computer on which the posting is displayed based on the address information in response to a request of the user. The method may further include providing a notification about the point of interest in response to a location associated with the user approaching within a desired distance from the point of interest. The method may also include moving from a screen for providing the notification to a page accessible to the computer on which the posting is displayed or a map service screen comprising the point of interest based on the address information, in response to a request of the user.

According to another aspect of an example embodiment, there may be provided a map service providing system including a map service providing apparatus that may include a memory having computer readable instructions stored thereon, and at least one processor configured to execute the computer readable instructions to recognize an execution of a storage capability or a sharing capability by a user to a posting displayed on a page accessible to a computer, extract region information attached to the posting in response to the execution of the storage capability or the sharing capability, store address information of the posting and the extracted region information associated with the user, and display a point of interest corresponding to the region information on a map service screen associated with the user.

The storage capability may be configured to save address information of the posting, and the sharing capability may be configured to call a map service for sharing information associated with the posting.

The storage capability may include at least one of a shortcut adding capability configured to set a shortcut to address information of the posting, a capturing capability configured to capture a page screen on which the posting is displayed, a copying capability configured to copy at least one of partial content of the posting and the address information to a clipboard, and a memo capability configured to store at least one of the partial content of the posting and the address information as a memo.

The sharing capability may be configured to call at least one service among a messenger, an e-mail, a message, a video, and a social networking service (SNS) to share information associated with the posting.

The at least one processor may be configured to execute the computer readable instructions display information comprising at least one representative image associated with the posting at the point of interest.

The at least one processor may be configured to execute the computer readable instructions to display, as the representative image, any one of an image disposed at a top end of the posting among images attached to the posting, an image set by a creator of the posting, and an image set by the user, or an image captured from a video attached to the posting.

The at least one processor may be configured to execute the computer readable instructions to provide a notification about the point of interest in response to a location associated with the user approaching within a desired distance from the point of interest.

According to an example embodiment, there may be provided a non-transitory computer-readable medium including computer readable instructions, which when executed by a processor, configures the processor to, extract region information attached to a posting in response to an execution of a storage capability or a sharing capability by a user to the posting displayed on a page accessible to a computer, storing address information of the posting and the extracted region information associated with the user, and displaying a point of interest corresponding to the region information on a map service screen associated with the user.

The non-transitory computer-readable recording medium may further include instructions to provide a notification about the point of interest in response to a location associated with the user approaching within a desired distance from the point of interest.

According to some example embodiments, when a user verifies a posting through a search and directly consumes the posting using a function and/or capability such as a bookmark function and/or capability or a sharing function and/or capability, region information attached to the posting may be automatically stored in a map service. Accordingly, the user may create a personalized map based on region information of postings generally searched and consumed by the user and accordingly, may conveniently search for information about a point of interest on a map.

Also, according to some example embodiments, region information of a posting directly consumed by a user using a function and/or capability such as a bookmark function and/or capability or a sharing function and/or capability may be automatically stored in a map service and a push notification may be provided to the user when the user is located around the region information. Accordingly, although the user does not conduct a search around the point of interest, the user may be informed of region information through a notification and thus, it is possible to enhance the user convenience and to increase a connection rate to a map service.

It is to be understood that both the foregoing general description and the following detailed description are explanatory and are intended to provide further explanation of the example embodiments as claimed.

BRIEF DESCRIPTION OF THE DRAWINGS

The foregoing and other features of example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of the example embodiments. In the drawings.

DETAILED DESCRIPTION OF EXAMPLE EMBODIMENTS

Figure 1:
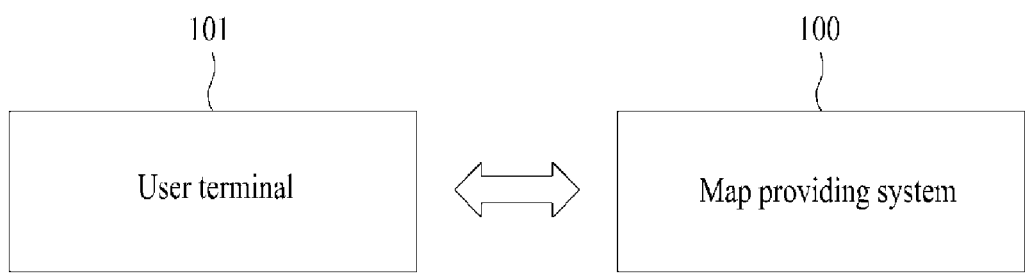
FIG. 1 is a diagram illustrating a relationship between a user terminal and a map providing system according to an example embodiment.

Example embodiments are described more fully hereinafter with reference to the accompanying drawings, in which example embodiments are shown. The example embodiments may, however, be embodied in many different forms and should not be construed as limited to the example embodiments set forth herein. Rather, these example embodiments are provided so that this disclosure is thorough, and will fully convey the scope of the example embodiments to those skilled in the art.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

At least one example embodiment relates to a technology for providing a personalized map service, and may be applicable to a variety of location based services (LBSs) such as a location verification service, a route finding/route guidance service, and/or a region search service.

FIG. 1 is a diagram illustrating a relationship between a user terminal and a map providing system according to at least one example embodiment. FIG. 1 illustrates the map providing system 100 and the user terminal 101. In FIG. 1, an arrow indictor may indicate that data may be transmitted and received between the map providing system 100 and the user terminal 101 over a wired/wireless network.

The user terminal 101, may be a device such as a personal computer (PC), a smartphone, a tablet, a laptop computer, a digital multimedia broadcasting (DMB) terminal, a portable multimedia player (PMP), a navigation terminal, and/or the like, and may indicate any type of terminal devices capable of connecting to a website/mobile site associated with the map providing system 100 or installing and executing a service exclusive application associated with the map providing system 100. Here, the user terminal 101 may perform the overall service operation such as a service screen configuration, a data input, a data transmission and reception, and a data storage, under control of the website/mobile site and/or the exclusive application.

The map providing system 100 may function as a service platform to provide a map service to the user terminal 101 that may be a client to the map providing system. In particular, the map providing system 100 may be an apparatus, such as a server or other computing device that may provide a map service to a user in a personalized form by automatically storing region information of a posting consumed by the user through another service on the user terminal 101.

The term "posting" used herein may indicate any type of open document posted on the Internet such as blog websites, cafes websites, news websites, social media websites, messaging websites, content providing websites, website forums, or the like.

Figure 2:
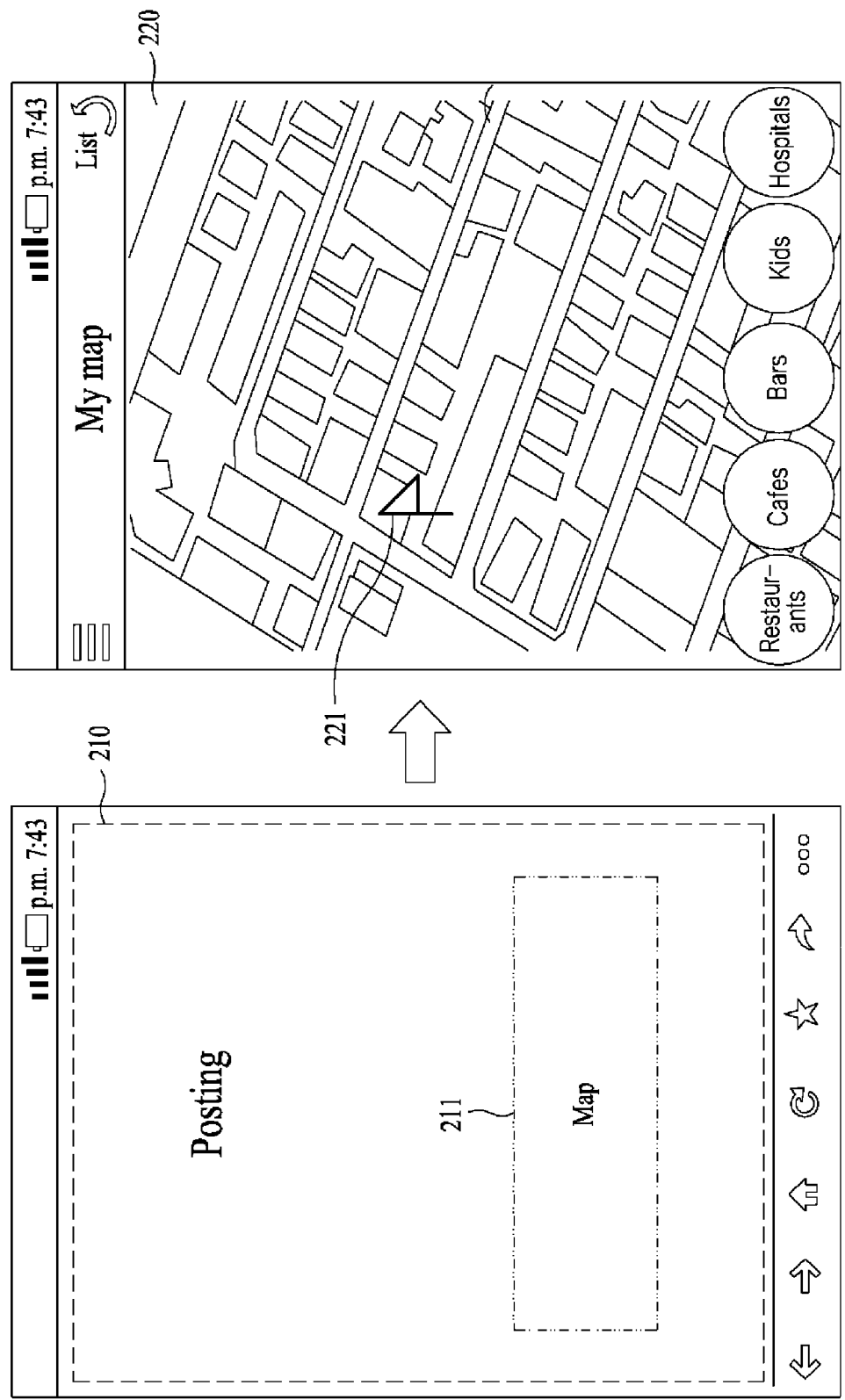
FIG. 2 illustrates an example of technology for personalizing a map according to an example embodiment.

Referring to FIG. 2, when a posting 210 consumed (i.e., read, visited, or the like) by a user in interaction with the user terminal 101 is a document attached with a map 211, the map providing system 100 may provide a service in a personalized map form by automatically storing region information corresponding to the map 211, for example, location information of a point of interest (POI) indicated by the map 211 and by displaying region information of the posting 210 consumed by the user as a POI 221 on a map service screen 220 when providing a map service to the user.

Figure 3:
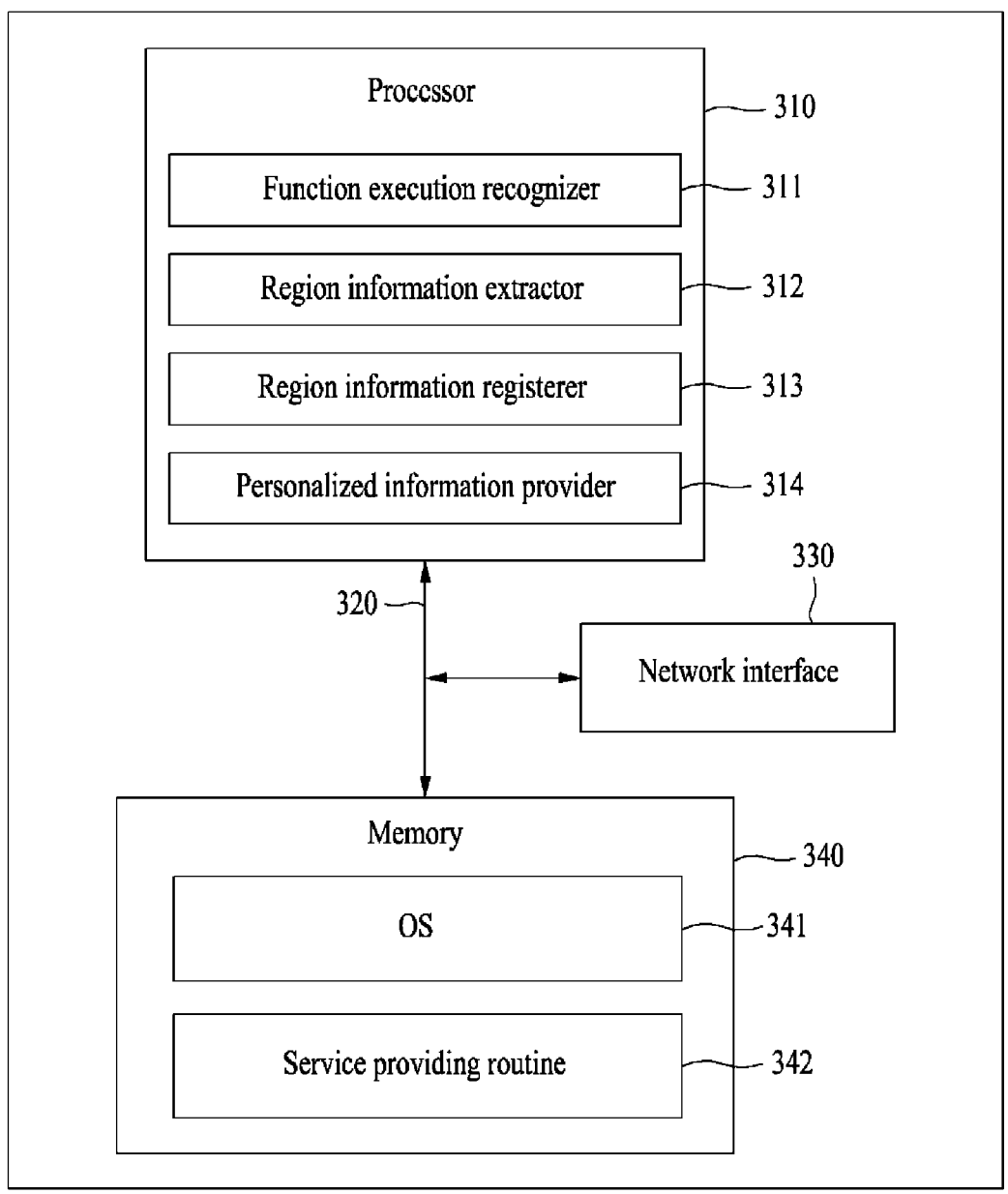
FIG. 3 is a block diagram illustrating a configuration of a map providing system according to an example embodiment.
Figure 4:
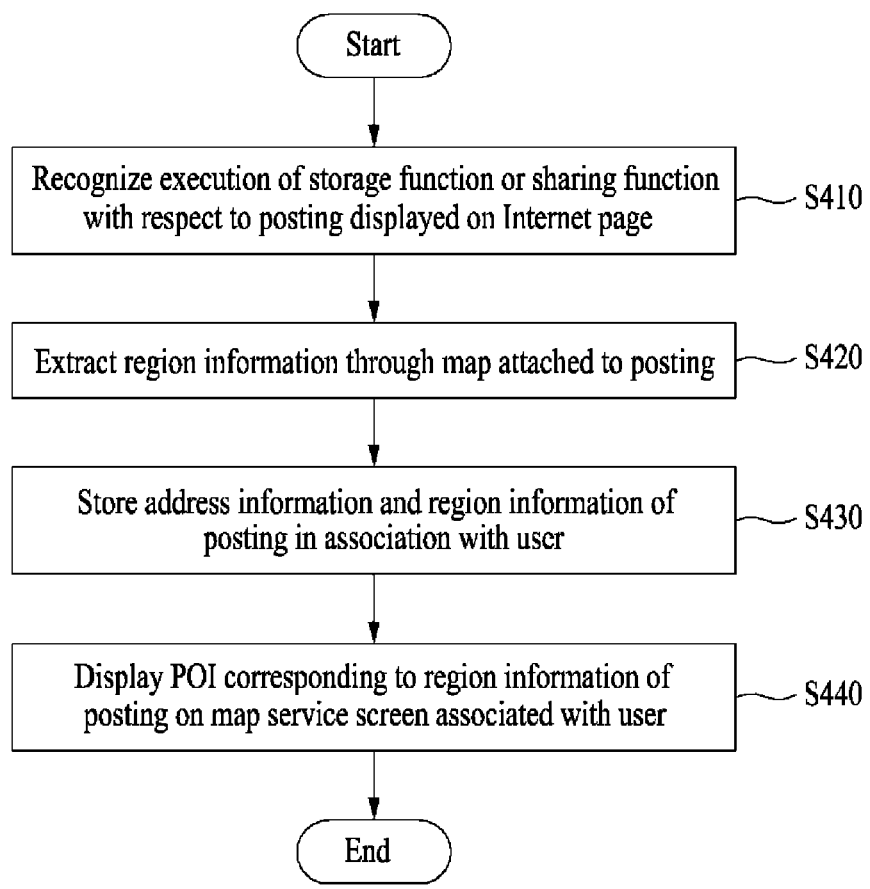
FIG. 4 is a flowchart illustrating a map providing method according to an example embodiment.

FIG. 3 is a block diagram illustrating a configuration of a map providing system according to at least one example embodiment, and FIG. 4 is a flowchart illustrating a map providing method according to example embodiments.

Referring to FIG. 3, the map providing system 300 may include at least one processor 310, a bus 320, a network interface 330, and a memory 340. The memory 340 may include an operating system (OS) 341 and a service providing routine 342. The processor 310 may be configured to process computer readable instructions of, for example, a computer program by performing a basic arithmetic and logic operation, and an input/output (I/O) operation of the map providing system 300, thereby transforming the processor 310 into a special purpose processor. The computer readable instructions may be stored on the memory 340 or other memory. The processor 310 may be configured to execute the computer readable instructions as one or more program modules, such as the function execution recognizer 311, the region information extractor 312, the region information registerer 313, or the personalized information provider 314.

According to other example embodiments, the map providing system 300 may include additional constituent elements than the number of constituent elements depicted in FIG. 3.

The memory 340, as non-transitory computer readable media, may include a permanent mass storage device such as random access memory (RAM), read only memory (ROM), and/or a disk drive. Also, program modules for the OS 341 and the service providing routine 342 may be stored in the memory 340. The software constituent elements may be loaded from non-transitory computer-readable media separate from the memory 340 using a drive mechanism (not shown). The non-transitory computer-readable media may include computer-readable media such as a floppy disk, a tape, a DVD/CD-ROM drive, and a memory card. According to other example embodiments, the software constituent elements may be loaded to the memory 340 through the network interface 330, instead of using the non-transitory computer readable media.

The bus 320 may enable communication and data transmission between the constituent elements of the map providing system 300. The bus 320 may be configured using a high-speed serial bus, a parallel bus, a storage area network (SAN), and/or other appropriate communication technologies.

The network interface 330 may be a computer hardware constituent element to connect the map providing system 300 to a computer network. The network interface 330 may connect the map providing system 300 to the computer network through a wireless or wired connection.

The function execution recognizer 311, the region information extractor 312, the region information registerer 313, and/or the personalized information provider 314 program modules may be configured to perform operations S410 through S440 of FIG. 4.

In operation S410, according to an example embodiment, the function execution recognizer 311 may recognize a user consumption reaction indicating a direct posting consumption with respect to a posting displayed on an Internet page (i.e., a webpage, intranet page, extranet page, or other page accessible to a computer and/or computing device) in response to an execution of the Internet page (or the like) on a user terminal. In this example, the function execution recognizer 311 may recognize an execution of a storage function (i.e., storage capability) or a sharing function (i.e., sharing capability) on the Internet page (or the like) on which the posting is displayed, as the user consumption reaction to the posting. As an example, the function execution recognizer 311 may recognize a bookmark function and/or capability to address information of the posting as the storage function and/or capability. As another example, the function execution recognizer 311 may recognize, as the storage function and/or capability, at least one of a shortcut adding function and/or capability of setting a shortcut to address information of the posting, a capturing function and/or capability of capturing a page screen on which the posting is displayed, a copying function and/or capability of copying at least one of partial content of the posting and the address information to a clipboard, a memo function and/or capability of storing at least one of the partial content of the posting and the address information as a memo, or the like. As another example, the execution recognizer 311 may recognize, as the sharing function and/or capability, a function and/or capability of calling a map service provided from the map providing system 300 to share information associated with the posting on the Internet page, or the like. As another example, the execution recognizer 311 may recognize, as the sharing function and/or capability, a function and/or capability of calling at least one service among a messenger, an e-mail, a message, a video, and/or a social networking service (SNS) to share information associated with the posting.

Figure 5:
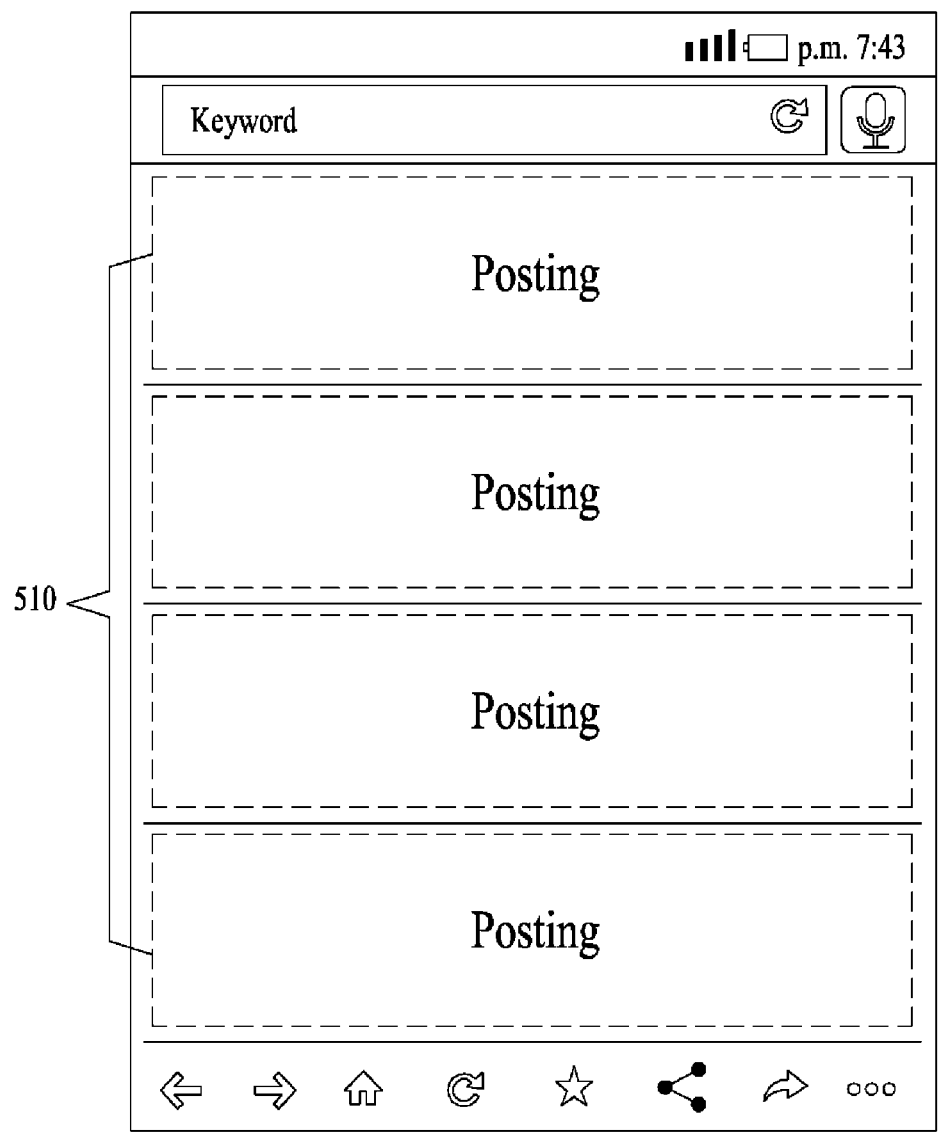
FIGS. 5 through 10 illustrate examples of consuming, by a user, a posting according to at least one example embodiment.
Figure 6:
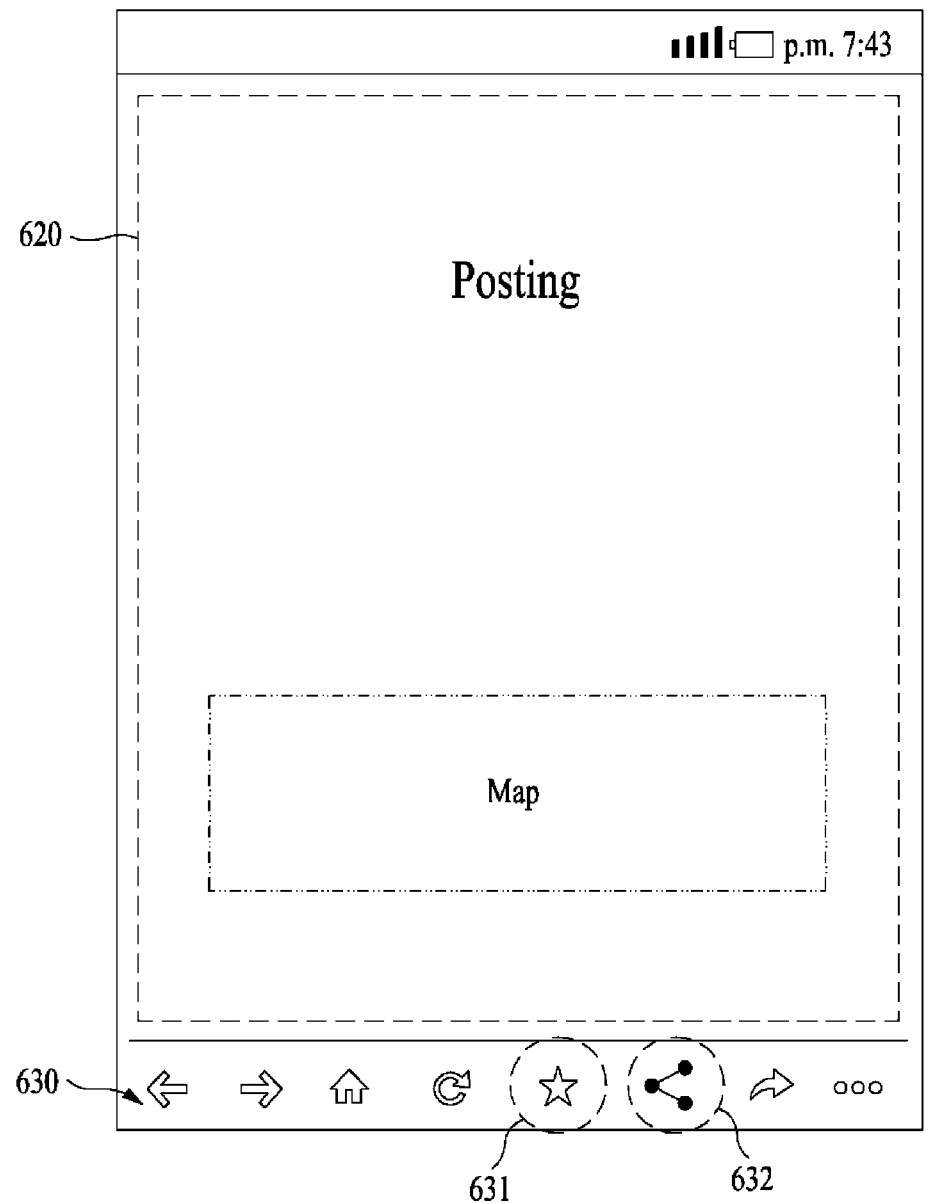

Referring to FIG. 5, according to an example embodiment, a user may search for postings on the Internet, or other computer network, by connecting to a website/mobile site providing a search service or by executing a service exclusive application on a user terminal, and may select and verify each posting from a search result list 510 provided from a search service. Referring to FIG. 6, according to an example embodiment, when the user selects a desired and/or predetermined posting from a search result list, a full text of the selected posting may be displayed on an Internet page 620 of the search service. The user terminal may provide a menu list, a list of commands, or the like, for interaction with the user on a search service screen. Here, the menu list, list of commands, or the like, may include menus and/or commands capable of executing at least one of a storage function and/or capability and a sharing function and/or capability with respect to a posting.

For example, referring to FIG. 6, the user terminal may provide a 'bookmark add' menu 631 corresponding to the storage function and/or capability to a posting and a 'page share' menu 632 corresponding to the sharing function and/or capability through a menu bar 630, for example, a toolbar, executed on the Internet page 620.

Figure 7:
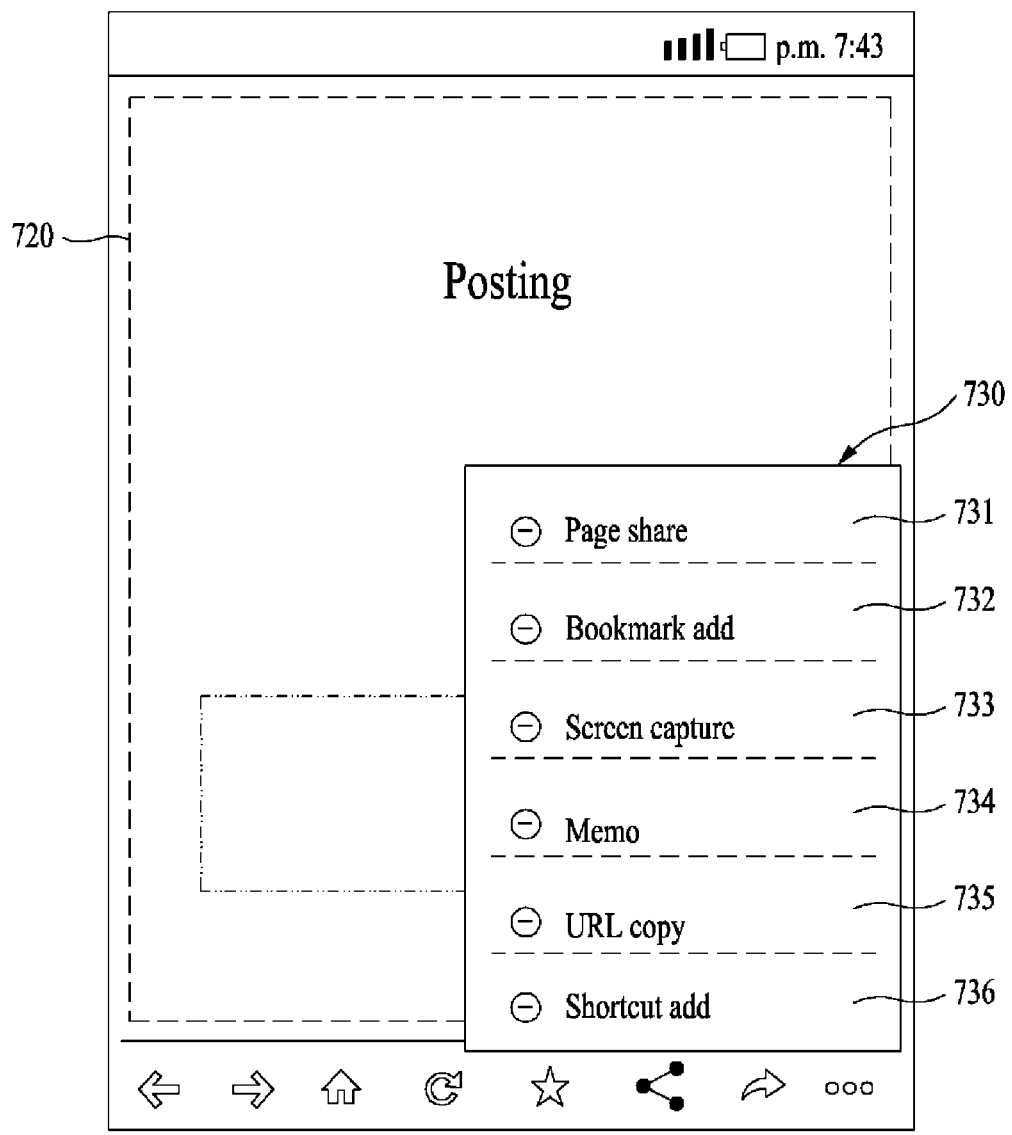

As another example, referring to FIG. 7, the user terminal may provide a 'page share' menu 731 corresponding to the sharing function and/or capability, a 'bookmark add' menu 732 corresponding to the storage function and/or capability, a 'screen capture' menu 733, a 'memo' menu 734, a 'URL copy' menu 735, and a 'shortcut add' menu 736 through a menu window 730 executed through a separate input on an Internet page 720.

Figure 8:
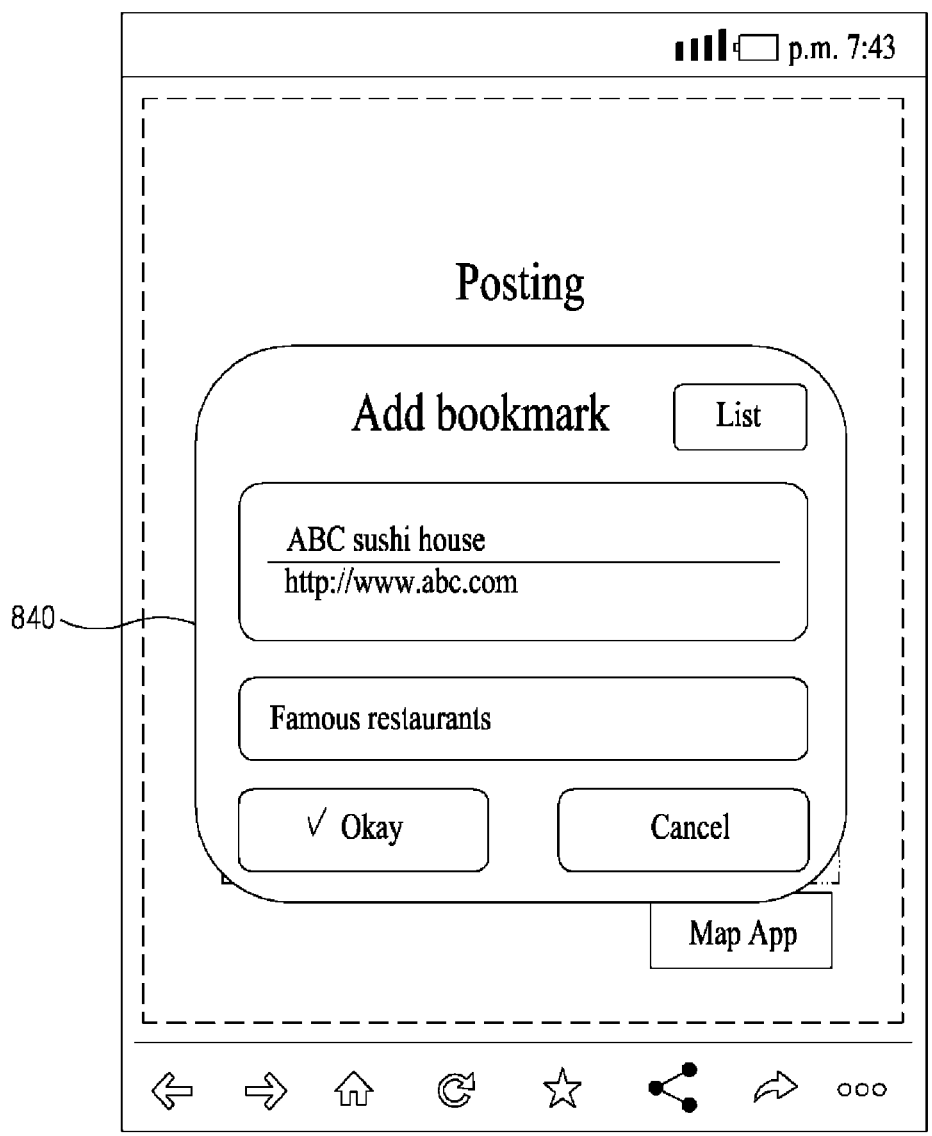
Figure 9:
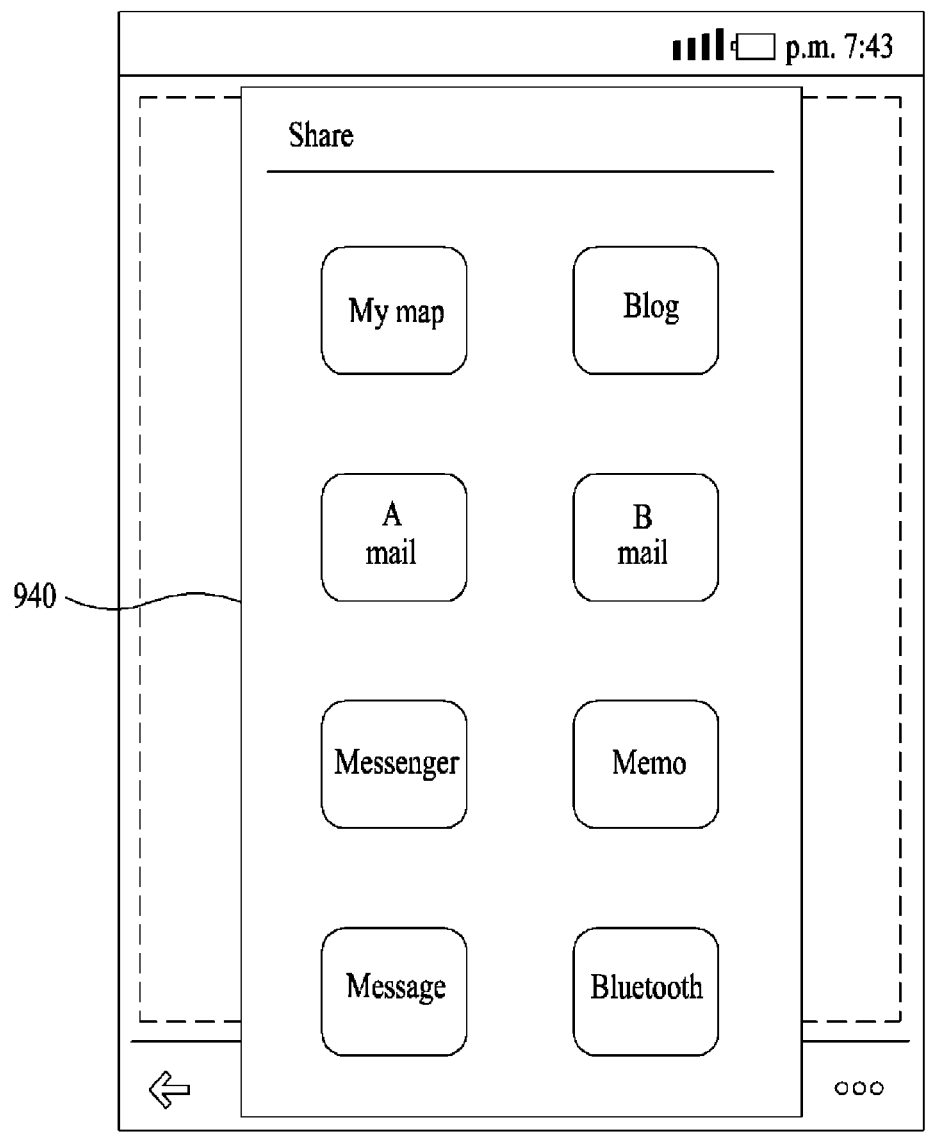

When the 'bookmark add' menu 631 of FIG. 6 or the 'bookmark add' menu 732 of FIG. 7 is selected, a screen 840 of FIG. 8 for adding a bookmark of an Internet page on which a posting is currently displayed may be provided. Further, when the 'page share' menu 632 of FIG. 6 or the 'page share' menu 731 of FIG. 7 is selected, a list 940 of services being called for sharing may be provided as illustrated in FIG. 9. The list 940 of services may include menus and/or commands for directly calling a map service provided from the map providing system or calling other services, such as a messenger, an e-mail, a message, a video, and/or an SNS in addition to the map service.

Figure 10:
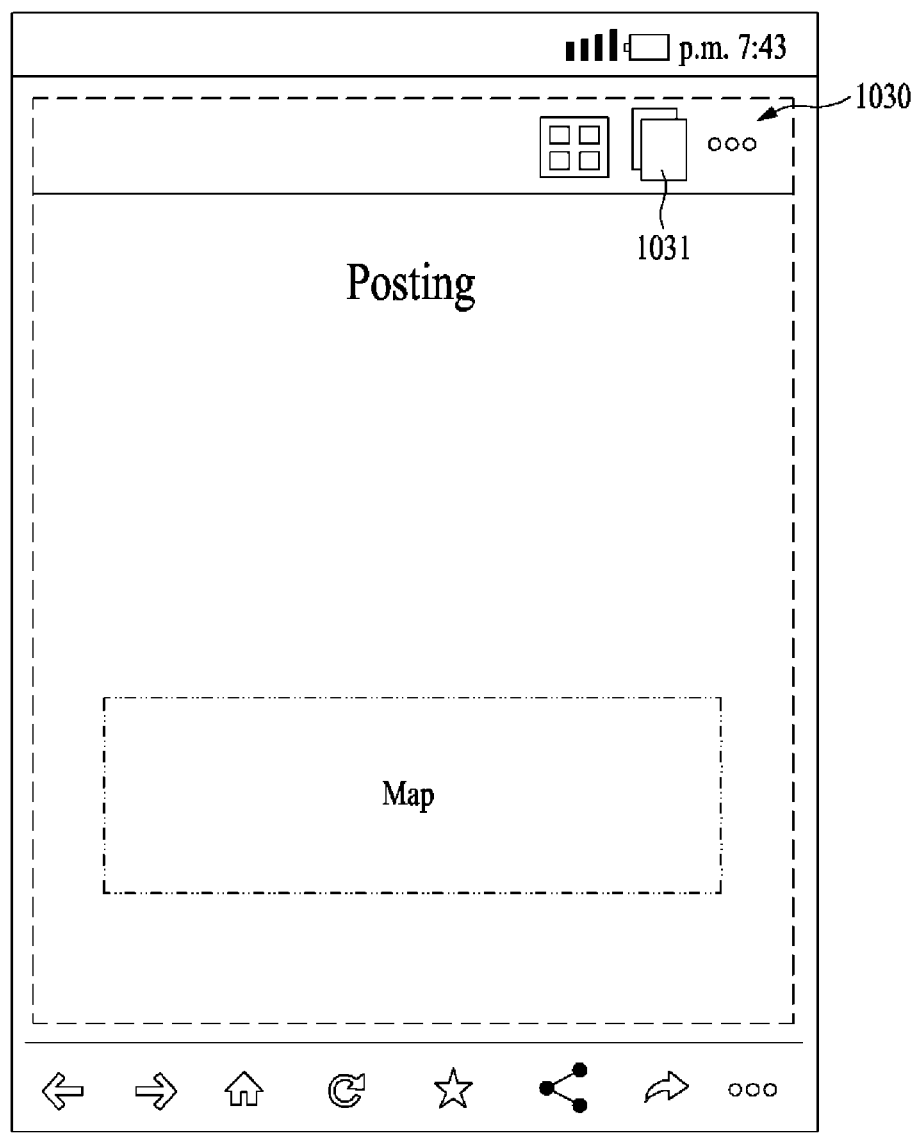

As another example, referring to FIG. 10, the user terminal may provide a 'copy' menu and/or command 1031 corresponding to the storage function and/or capability through an edition tool 1030 called on an Internet page 1020. For example, when the user long touches the Internet page 1020 on which a posting is displayed, the edition tool 1030 may be called. In this instance, the copy menu 1031 capable of selecting and copying at least a portion of content of the posting may be included in the edition tool 1030.

As described above with reference to FIGS. 6 through 10, when a menu and/or command corresponding to the storage function and/or capability or a menu and/or command corresponding to the sharing function and/or capability is selected by the user on an Internet page (or the like) on which a posting is displayed, the function execution recognizer 311 may recognize that the storage function and/or capability or the sharing function and/or capability with respect to the posting was executed, that is, that the user has actually consumed the posting.

Referring again to FIG. 4, according to an example embodiment, when the storage function and/or capability or the sharing function and/or capability with respect to the posting displayed on the Internet page (or the like) on the user terminal is executed, the region information extractor 312 may extract region information through a map attached to the posting in operation 5420. That is, when the posting of which the storage function and/or capability or the sharing function and/or capability is executed by the user is a document such as a blog posting or a café posting attached with a map, the region information extractor 312 may control the user terminal to extract region information, for example, a POI of the attached map and to transmit the extracted region information to a map service. In this example, the region information extractor 312 may verify address information, for example, a uniform resource locator (URL) address, of the posting of which the storage function and/or capability or the sharing function and/or capability is executed, and identification information, for example, an ID and a terminal serial number (SN), of the user together with region information of the posting. Further, the region information extractor 312 may extract information including a title and a representative image of the posting during a process of extracting region information of the posting. Here, the representative image may be any one of an image disposed at a top end of the posting among images attached to the posting, an image set by a creator of the posting, and an image set by the user, and/or an image captured from a video attached to the posting.

In operation 5430, the region information registerer 313 may register region information of the posting directly consumed by the user to a map service by storing region information of the posting of which the storage function and/or capability or the sharing function and/or capability is executed in the user terminal in association with address information of the posting and identification information of the user. That is, the region information registerer 313 may register, as personalization information of the user, region information of the map attached to the posting consumed by the user through a bookmark, a screen capturing, saving as a memo, a URL copy, a shortcut adding, sharing with a map service, and/or sharing with another service such as a messenger, an e-mail, a message, a video, and/or an SNS. In this example, the region information registerer 313 may also store information extracted by the region information extractor 312 together with region information of the posting consumed by the user.

Figure 11:
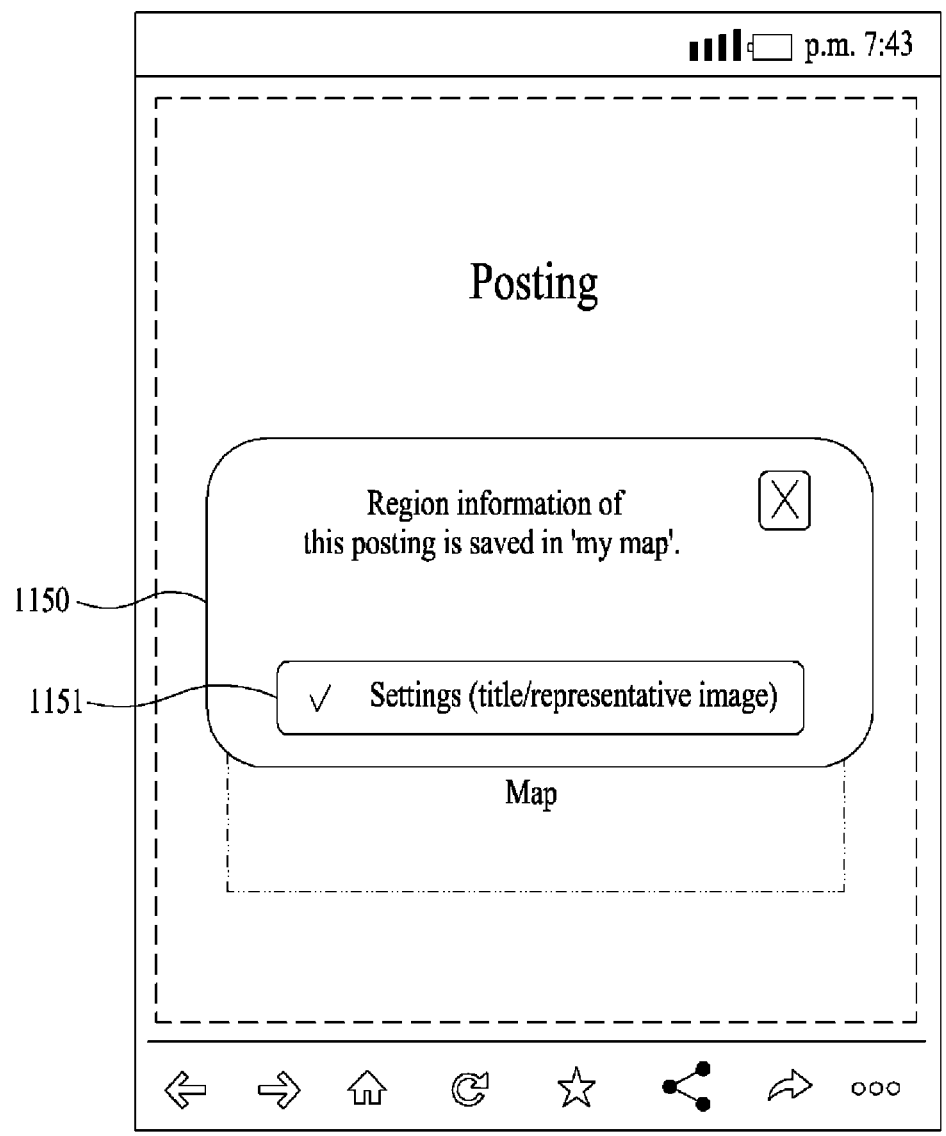
FIG. 11 illustrates an example of a screen for notifying a result of registering region information according to an example embodiment.

Once a region information registration of the posting is completed, the region information registerer 313 may provide the user with a notification about the completion of an information registration. For example, referring to FIG. 11, a notification window 1150 indicating that region information of a posting is registered to a map service may be provided on a page of which a storage function and/or capability or a sharing function and/or capability with respect to the posting is executed by the user. Here, the notification window 1150 may also provide a setting menu and/or command 1151 that enables the user to set information of the posting with respect to region information registered to the map service. For example, when additionally displaying region information of a posting consumed by the user on a map service screen, the information may include a title or a representative image of the posting as information to be displayed on a screen. Accordingly, the region information registerer 313 may also store information of the posting set by the user when registering region information of the posting consumed by the user.

Figure 12:
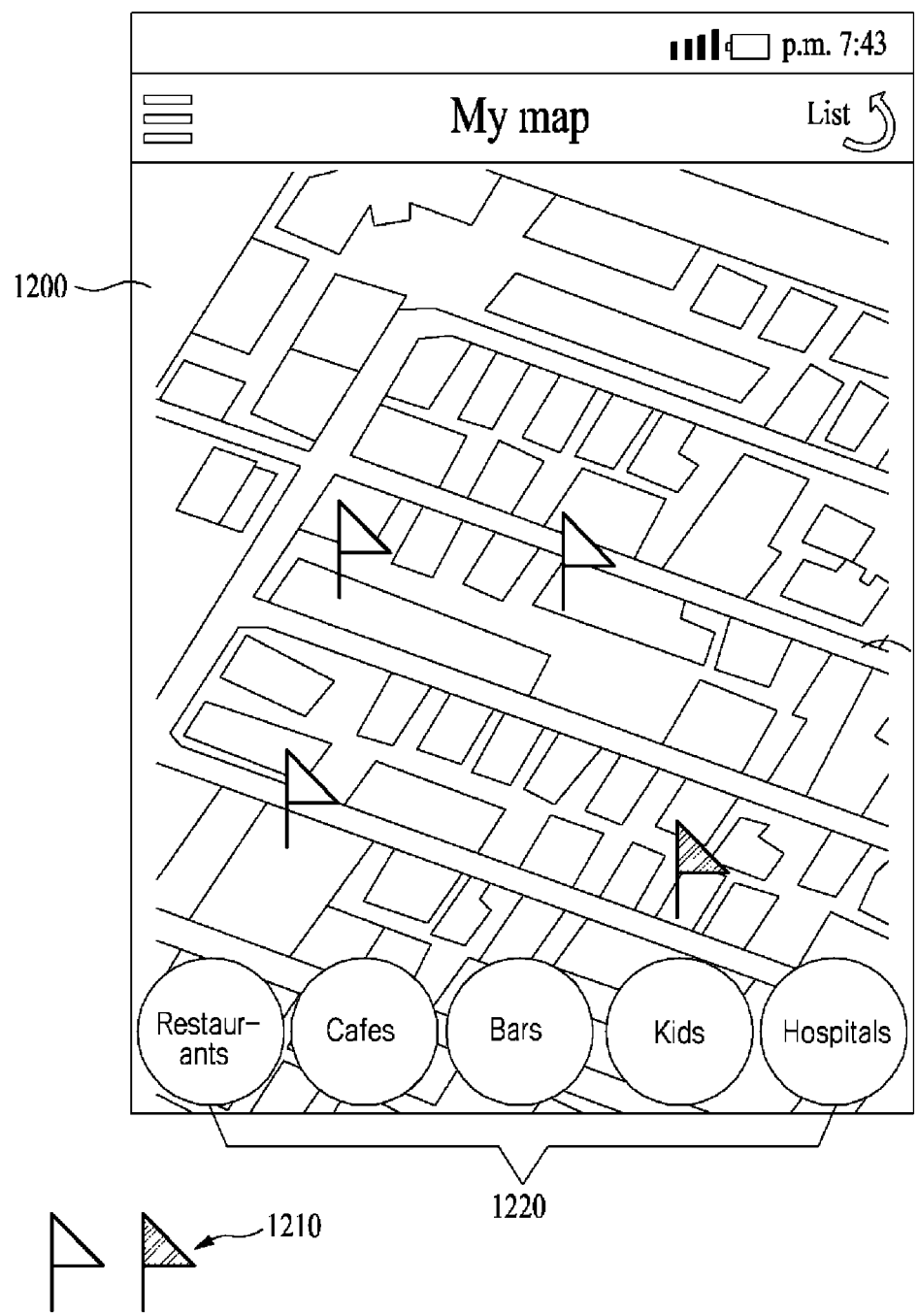
FIGS. 12 and 13 illustrate examples of a personalized map service screen according to at least one example embodiment.

Referring again to FIG. 4, in operation S440, the personalization information provider 314 may display a POI (hereinafter, also referred to as a registration point) corresponding to the registered region information on the map service screen associated with the user. Here, the personalization information provider 314 may sort and display the registration point on the map service screen based on at least one item of a region and a category. As an example, the personalization information provider 314 may automatically add and display a registration point of the user on a map service screen of a service request area when the user requests a map service over a desired and/or predetermined region. For example, referring to FIG. 12, the personalization information provider 314 may provide a map service screen 1200 about a service request region of the user. Here, the personalization information provider 314 may display a desired and/or predetermined marker 1210 at each registration point present on a region of the map service screen 1200. Accordingly, the personalization information provider 314 may provide the user with a service in a personalized map form by displaying region information of a posting consumed by the user through the marker 1210 on the map service screen 1200 when providing a map service to the user.

Further, the personalization information provider 314 may classify and thereby display the marker 1210 based on a category of a registration point. For example, referring to FIG. 12, when a category 1220 for classifying a registration point is classified into restaurants, cafés, bars, kids, hospitals, or the like, the marker 1210 of a registration point may be displayed by using a different color based on each category. Further, in addition to a method of collectively displaying the entire registration points present in a region of the map service screen 1200, the personalization information provider 314 may selectively display a registration point of a category selected by the user by providing a user interface (UI) environment in which the user may select a desired category.

Figure 13:
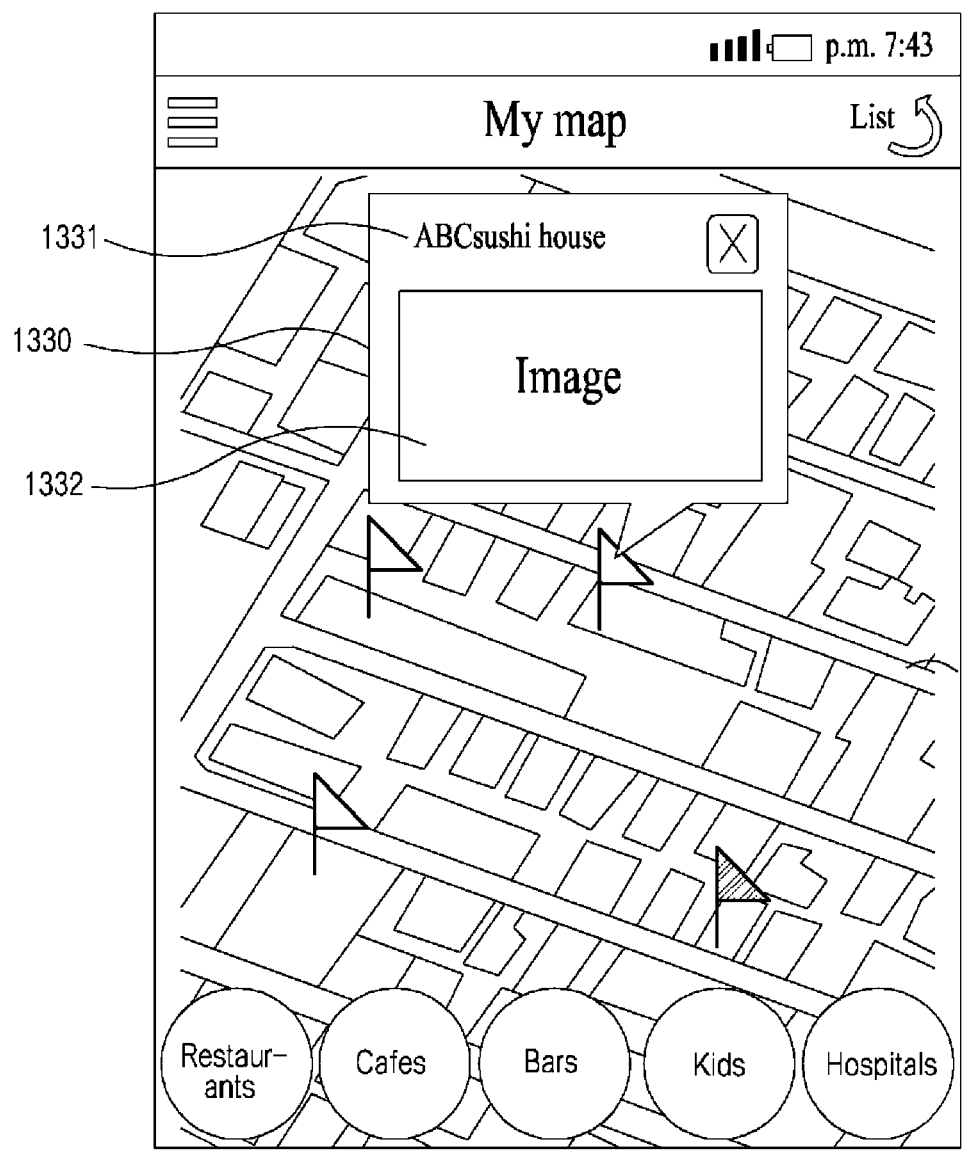

The personalization information provider 314 may display information including at least one image associated with a posting at a registration point on a personalized map service screen of the user. For example, referring to FIG. 13, when the user selects a registration point on a map service screen, the user may display information at the registration point through a tooltip 1330. As an example, information may include a title 1331 and a representative image 1332. Here, the title 1331 may use at least one of a title of a posting input by a creator, a title input from a user having consumed the posting, and a POI name on a map corresponding to a registration point. The representative image 1332 may use at least one of an image disposed at a top end of the posting, a representative image set by the creator when creating the posting, an image captured from a video attached to the posting, and an image set by the user having consumed the posting.

In particular, when the user selects a desired and/or predetermined registration point on a personalized map service screen, the personalization information provider 314 may read address information of a posting registered in association with the selected registration point and may support a connection to an Internet page (or the like) of the posting. For example, referring to FIG. 13, when the user selects information, for example, the title 1331 or the representative image 1332 displayed on the tooltip 1330 at the registration point, the personalization information provider 314 may recognize the selection as a request for details and/or information about the registration point, and in response thereto, may connect to an Internet page (or the like) (see FIG. 6) of the posting. Accordingly, according to at least one example embodiment, instead of searching for information using a separate search route, the user may immediately verify region information of a posting consumed by the user through a personalized map service of the user.

Figure 14:
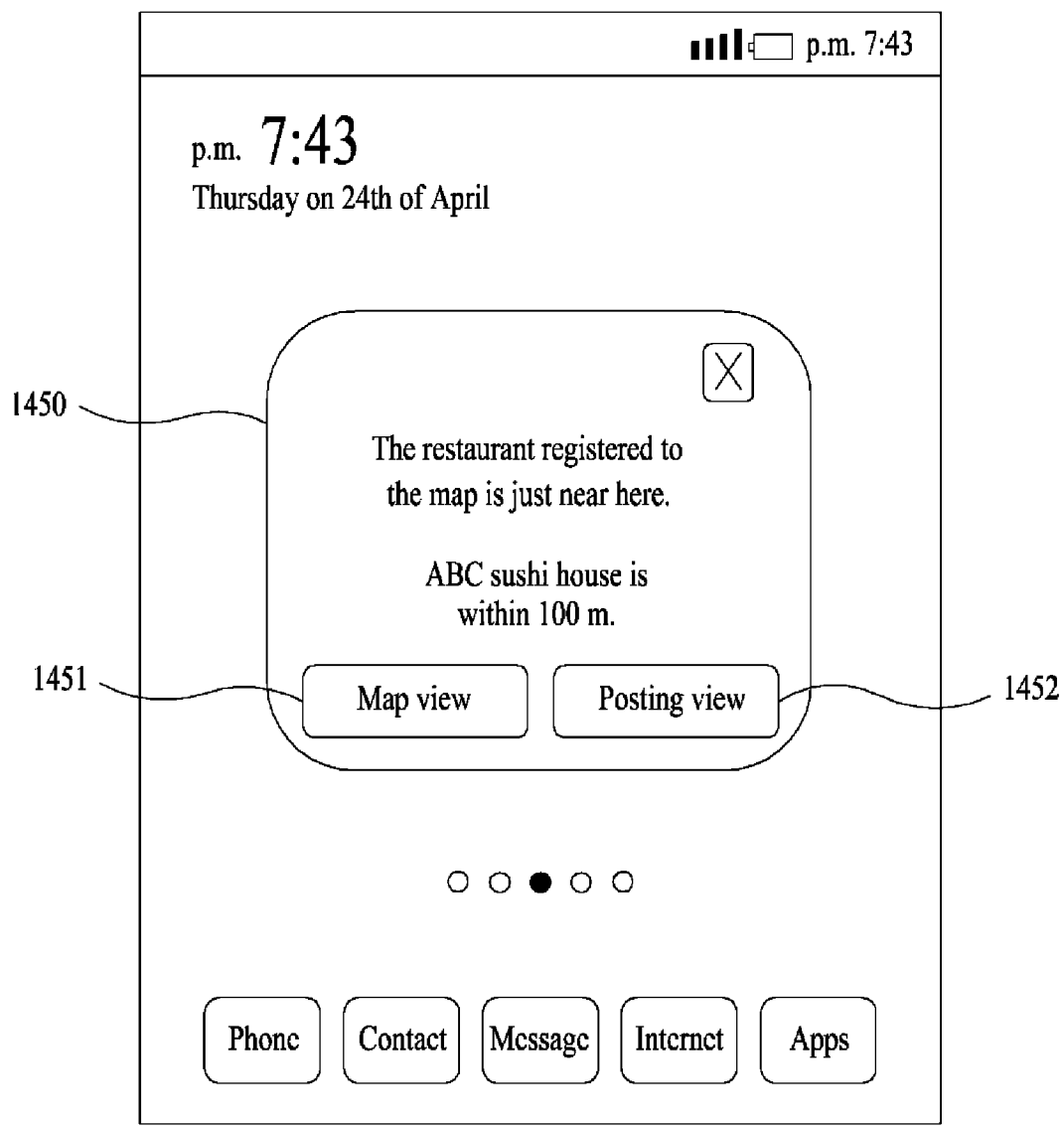
FIG. 14 illustrates an example of a screen for notifying an approach to region information registered to a map service according to an example embodiment.

Further, when a location associated with the user enters within a desired and/or predetermined distance from a registration point registered to a map service, the personalization information provider 314 may provide a push notification to the user about the registration point. For example, referring to FIG. 14, when the user approaches within a desired and/or predetermined distance, for example, 100 m from a registration point registered to region information of a posting consumed by the user, that is, a map service, a notification window 1450 indicating that the user is around the registration point may be provided. In response to a user request through the notification window 1450, the personalization information provider 314 may support a connection to an Internet page (or the like) of the posting or a connection to a map service screen including the registration point. To this end, the notification window 1450 may provide a UI that enables the user to connect to a details and/or information screen associated with the registration point, and may also provide a UI including a 'map view' menu and/or command 1451 capable of connecting to a personalized map service screen (see FIG. 12) of the user and a 'posting view' menu and/or command 1452 capable of connecting to an Internet page (or the like) of a posting. According to some example embodiments, a notification may be provided to the user when the user is around and/or proximate to a registration point. Accordingly, although the user does not search for a separate route, the user may immediately approach a posting in which the registration point is attached as region information through a map service.

Figure 15:
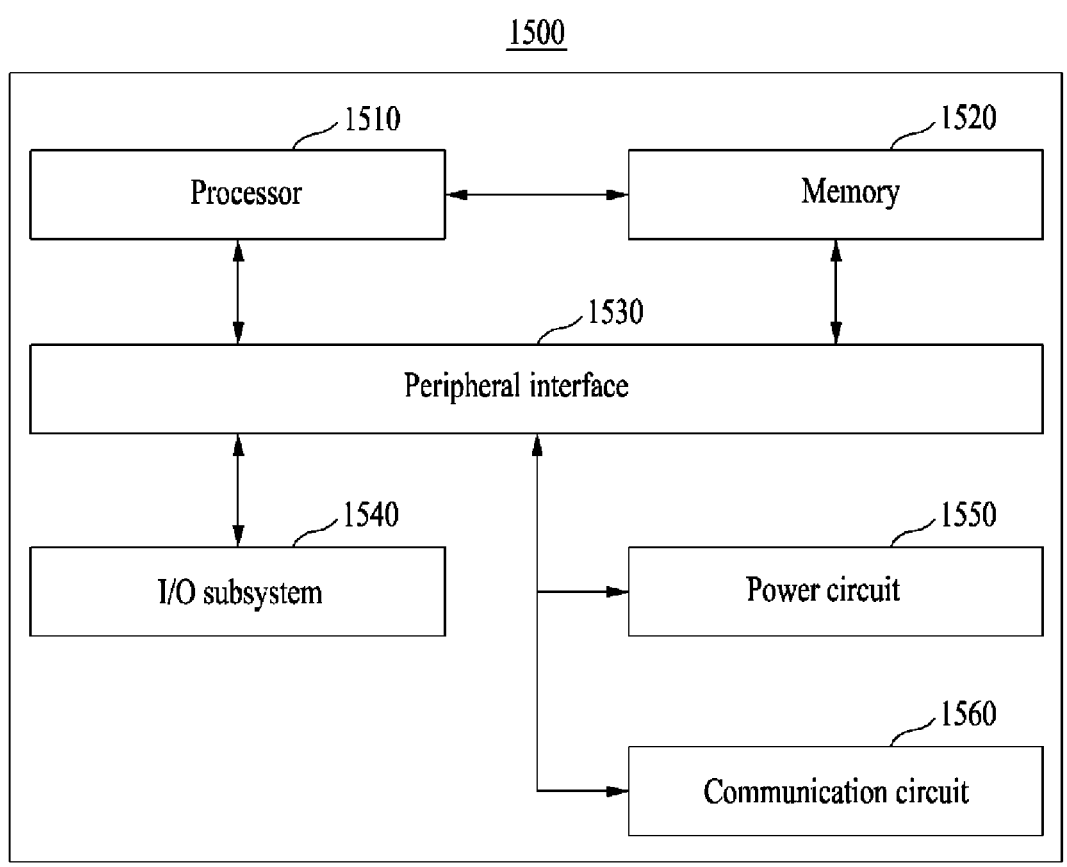
FIG. 15 illustrates an example of a configuration of a computer system according to an example embodiment.

FIG. 15 is a block diagram illustrating an example of a configuration of a computer system 1500 according to an example embodiment. Referring to FIG. 15, the computer system 1500 may include at least one processor 1510, a memory 1520, a peripheral interface 1530, an input/output (I/O) subsystem 1540, a power circuit 1550, and/or a communication circuit 1560. Here, the computer system 1500 may correspond to a user terminal.

The memory 1520 may include, for example, a high-speed random access memory (HSRAM), a magnetic disk, a static random access memory (SRAM), a dynamic RAM (DRAM), read only memory (ROM), a flash memory, and a non-volatile memory. The memory 1520 may include a software module, an instruction set, or a variety of data required for an operation of the computer system 1500. Here, an access from another component such as the processor 1510 and the peripheral interface 1530 to the memory 1520 may be controlled by the processor 1510.

The peripheral interface 1530 may couple an input device and/or output device of the computer system 1500 with the processor 1510 and the memory 1520. The processor 1510 may perform a variety of functions and/or capabilities for the computer system 1500 and process data by executing the software module or the instruction set stored in the memory 1520.

The I/O subsystem 1540 may couple various I/O peripheral devices with the peripheral interface 1530. For example, the I/O subsystem 1540 may include a controller for coupling the peripheral interface 1530 and a peripheral device such as a monitor, a keyboard, a mouse, a printer, and a touch screen or a sensor depending on a necessity. The I/O peripheral devices may be coupled with the peripheral interface 1530 without using the I/O subsystem 1540.

The power circuit 1550 may supply a power to all of or a portion of components of a terminal. For example, the power circuit 1550 may include a power management system, at least one power source such as a battery and alternating circuit (AC), a charge system, a power failure detection circuit, a power converter or inverter, a power status indicator, or other components for creating, managing and distributing power.

The communication circuit 1560 enables communication with another computer system using at least one external port. Alternatively, as described above, the communication circuit 1560 may enable communication with another computer system by including a radio frequency (RF) circuit and thereby transmitting and receiving an RF signal known as an electromagnetic signal.

The example embodiments of FIG. 15 are only an example of the computer system 1500. The computer system 1500 may have a configuration or an arrangement for omitting a portion of the components illustrated in FIG. 15, further including components not illustrated in FIG. 15, or coupling two or more components. For example, a computer system for a communication terminal of a mobile environment may further include a touch screen, a sensor, and the like, in addition to the components of FIG. 15. A circuit for RF communication using a variety of communication methods, for example, wireless fidelity (Wi-Fi), $3^{rd}$ generation (3G), long term evolution (LTE), Bluetooth, near field communication (NFC), and ZigBee, may be included in the communication circuit 1560. Components includable in the computer system 1500 may be configured as special purpose hardware that includes an integrated circuit specified for at least one signal processing or application, software, or a combination of hardware and software.

Description is made above with reference to screens (see FIG. 2 and FIGS. 5 through 14) executed on a mobile terminal. However, it is only an example and the example embodiments are not limited thereto and may be implemented in a website environment of a general PC.

The methods according to the example embodiments may be configured in a program instruction form executable through various computer systems and thereby recorded in non-transitory computer-readable media.

In particular, a program according to the example embodiments may be configured as a PC-based program or an application exclusive for a mobile terminal. A map App according to the example embodiments may be configured as an independently operating program or may be configured in an in-app form of a desired and/or predetermined application to be operable on the desired and/or predetermined application.

The methods according to the example embodiments may be performed in such a manner that an application associated with a server system providing a map service to a user terminal controls the user terminal. As an example, the application may include a module configured to control the user terminal to extract region information attached to a posting in response to an execution of a storage function and/or capability or a sharing function and/or capability by a user to the posting displayed on an Internet page (or the like); a module configured to control the user terminal to store address information of the posting and the extracted region information in association with the user; and a module configured to control the user terminal to display a POI corresponding to the region information on a map service screen associated with the user. Also, the application may be installed in the user terminal through a file provided from a file distribution system. As an example, the file distribution system may include a file transmitter (not shown) to transmit the file in response to a request from the user terminal.

According to some example embodiments, when a user verifies a posting through a search and directly consumes the posting using a function and/or capability such as a bookmark function and/or capability or a sharing function and/or capability, region information attached to the posting may be automatically stored in a map service. Accordingly, the user may create a personalized map based on region information of postings generally searched and consumed by the user and accordingly, may conveniently search for information about a POI on a map. Also, according to some example embodiments, region information of a posting directly consumed by a user using a function and/or capability such as a bookmark function and/or capability or a sharing function and/or capability may be automatically stored in a map service and a push notification may be provided to the user when the user is located around the region information. Accordingly, although the user does not conduct a search around the POI, the user may be informed of region information through a notification and thus, it is possible to enhance the user convenience and to increase a connection rate to a map service.

The units and/or modules described herein may be implemented using hardware components, software components, or a combination thereof. For example, the hardware components may include processing devices, amplifiers, bandpass filters, analog to digital convertors, or the like. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A map service providing method comprising:
receiving, using at least one processor of a server, a first user input by a user on a first website related to a posting included in the first website, the first website not related to an online map service, the received first user input causing a display of a user interface including a plurality of sharing capability options, the plurality of sharing capability options including a first sharing capability configured to call a messenger service for sharing information associated with the posting via the messenger service, a second sharing capability configured to call a video service for sharing the information associated with the posting via the video service, and a third sharing capability configured to call a social networking service (SNS) for sharing the information associated with the posting via the SNS;

extracting, using the at least one processor, region information associated with the posting included in the first website and content from the posting in response to a second user input performed by the user on the user interface to select a sharing capability from the plurality of sharing capability options;

storing, using the at least one processor, network address information related to the posting, the extracted content from the posting, and the extracted region information associated with the posting, the stored network address information and the extracted region information stored in association with the user on memory of the server;

performing, using the at least one processor, the selected sharing capability in response to the second user input;

displaying, using the at least one processor, a point of interest (POI) corresponding to the extracted region information of the posting on a screen of an online map service application hosted by the server, the POI including the extracted content from the posting and obtained from the memory, wherein the POI is displayed on a map of the online map service and the extracted content is displayed on the map in association with the POI; and transmitting, using the at least one processor, a push notification related to the POI to the user in response to a location associated with the user approaching within a desired distance from the POI.

2. The method of claim 1, further comprising:
receiving, using the at least one processor, a third user input by the user on the first website related to the posting, the third user input related to a storage capability; and
the storage capability is configured to save uniform resource locator (URL) information related to the posting as the network address information.

3. The method of claim 1, further comprising:
receiving, using the at least one processor, a third user input by the user on the first website related to the posting, the received third user input causing a display of a plurality of storage capability options on the user interface, the plurality of storage capability options including a shortcut adding capability configured to set a shortcut to the network address information of the posting, a capturing capability configured to capture a page screen on which the posting is displayed, a copying capability configured to copy at least one of partial content of the posting and the network address information to a clipboard, and a memo capability configured to store at least one of the partial content of the posting and the network address information as a memo; and
performing, using the at least one processor, a selected storage capability in response to a fourth user input performed by the user on the user interface.

4. The method of claim 1, wherein the plurality of sharing capability options further includes:
a fourth sharing capability configured to call the online map service application for sharing the information associated with the posting via the online map service;
a fifth sharing capability configured to call an e-mail service for sharing the information associated with the posting via e-mail; and
a sixth sharing capability configured to call a Bluetooth application for sharing the information associated with the posting via Bluetooth communication.

5. The method of claim 1, wherein the displaying of the POI corresponding to the extracted region information further comprises:
sorting and displaying the POI based on at least one item of a region and a category.

6. The method of claim 1, wherein the content from the posting comprises at least one representative image extracted from the posting at the POI.

7. The method of claim 6, wherein the displaying of the POI corresponding to the extracted region information further comprises displaying, as the representative image, any one of an image at a top end of the posting among images attached to the posting, an image set by a creator of the posting, an image set by the user associated with the posting, or an image captured from a video attached to the posting.

8. The method of claim 1, further comprising:
transitioning, using the at least one processor, from the screen of the online map service application to the first website including the posting based on the network address information in response to a request of the user.

9. The method of claim 1, further comprising:
displaying, using the at least one processor, the push notification on a screen; and
displaying, using the at least one processor, the first website that includes the posting or the screen of the online map service application comprising the POI based on the network address information, in response to a request of the user.

10. The method of claim 1, wherein the region information is extracted from a map attached to the posting on the first website.

11. The method of claim 1, wherein the first website is at least one of a blog website, a cafe website, a news website, a social media website, a messaging website, a website forum, or any combinations thereof.

12. A map service providing system comprising:
a server including a memory and at least one processor;
the memory having computer readable instructions stored thereon; and
the at least one processor configured to execute the computer readable instructions to cause the server to,
recognize a first user input performed by a user on a website related to a posting included in the website, the website not related to an online map service, the first user input causing a display of a user interface including a plurality of sharing capability options, the plurality of sharing capability options including a first sharing capability configured to call a messenger service for sharing information associated with the posting via the messenger service, a second sharing capability configured to call a video service for sharing the information associated with the posting via the video service, and a third sharing capability configured to call a social networking service (SNS) for sharing the information associated with the posting via the SNS;
extract region information associated with the posting, content from the posting, and network address information related to the posting in response to a second user input performed by the user on the user interface to select a sharing capability from the plurality of sharing capability options;

store the network address information related to the posting, the extracted content of the website, and the extracted region information in association with the user on the memory;

perform the selected sharing capability in response to the second user input;

display a point of interest (POI) corresponding to the extracted region information associated with the user on a screen of an online map service application hosted by the server, the POI including the extracted content from the posting and obtained from the memory, wherein the POI is displayed on a map of the online map service and the extracted content is displayed on the map in association with the POI; and transmit a push notification related to the POI to the user in response to a location associated with the user approaching within a desired distance from the POI.

13. The map service providing system of claim 12, wherein the server is further caused to:

recognize a third user input by the user on the website related to the posting, the third user input related to a storage capability; and the storage capability is configured to save uniform resource locator (URL) information related to the posting as the network address information.

14. The map service providing system of claim 12, wherein the server is further caused to:

recognize a third user input by the user on the website related to the posting, the third user input causing a display of a plurality of storage capability options on the user interface, the plurality of storage capability options including a shortcut adding capability configured to set a shortcut to the network address information of the posting, a capturing capability configured to capture a page screen on which the posting is displayed, a copying capability configured to copy at least one of partial content of the posting and the network address information to a clipboard, and a memo capability configured to store at least one of the partial content of the posting and the network address information as a memo; and perform a selected storage capability in response to a fourth user input performed by the user on the user interface.

15. The map service providing system of claim 12, wherein the content from the posting comprises at least one representative image extracted from the posting at the POI.

16. The map service providing system of claim 15, wherein the server is further caused to:

display, as the representative image, any one of an image at a top end of the posting among images attached to the posting, an image set by a creator of the posting, an image set by the user associated with the posting, or an image captured from a video attached to the posting.

17. The map service providing system of claim 12, wherein the region information is extracted from a map attached to the posting on the website.

18. The map service providing system of claim 12, wherein the website is at least one of a blog website, a cafe website, a news website, a social media website, a messaging website, a website forum, or any combinations thereof.

19. A non-transitory computer-readable medium including computer readable instructions, which when executed by at least one processor of a server causes the server to:

recognize a first user input performed by a user on a website related to a posting included in the website, the website not related to an online map service, the first user input causing a display of a user interface including a plurality of sharing capability options, the plurality of sharing capability options including a first sharing capability configured to call a messenger service for sharing information associated with the posting via the messenger service, a second sharing capability configured to call a video service for sharing the information associated with the posting via the video service, and a third sharing capability configured to call a social networking service (SNS) for sharing the information associated with the posting via the SNS;

extract region information associated with the posting included in the website and content from the posting in response to a second user input performed by the user on the user interface to select a sharing capability from the plurality of sharing capability options;

store network address information related to the posting, the extracted content of the website, and the extracted region information associated with the posting, the stored network address information and the extracted region information stored in association with the user on memory of the server;

perform the selected sharing capability in response to the second user input;

display a point of interest (POI) corresponding to the extracted region information of the posting on a screen of an online map service application hosted by the server, the POI including the extracted content from the posting and obtained from the memory, wherein the POI is displayed on a map of the online map service and the extracted content is displayed on the map in association with the POI; and transmit a push notification related to the POI to the user in response to a location associated with the user approaching within a desired distance from the POI.

20. The non-transitory computer-readable medium of claim 19, wherein the region information is extracted from a map attached to the posting on the website.

* * * * *